(12) United States Patent
Nammi

(10) Patent No.: US 8,908,747 B2
(45) Date of Patent: Dec. 9, 2014

(54) METHOD AND APPARATUS FOR CONTROLLING ADAPTIVE RANK MULTI ANTENNA COMMUNICATION

(75) Inventor: Sairamesh Nammi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 13/477,576

(22) Filed: May 22, 2012

(65) Prior Publication Data

US 2013/0315284 A1    Nov. 28, 2013

(51) Int. Cl.
*H04K 1/10* (2006.01)
*H04L 27/28* (2006.01)

(52) U.S. Cl.
USPC .......................................... 375/219; 375/260

(58) Field of Classification Search
CPC ...................................................... H04B 7/0639
USPC ................................................. 375/219, 260
See application file for complete search history.

(56) References Cited

U.S. PATENT DOCUMENTS

| | | | | |
|---|---|---|---|---|
| 2008/0298482 | A1* | 12/2008 | Rensburg et al. ............... | 375/260 |
| 2010/0284454 | A1* | 11/2010 | Oteri et al. ..................... | 375/224 |
| 2011/0096859 | A1* | 4/2011 | Kim et al. ....................... | 375/267 |
| 2013/0095839 | A1 | 4/2013 | Venkatraman et al. | |

FOREIGN PATENT DOCUMENTS

| | | |
|---|---|---|
| EP | 2190130 A1 | 5/2010 |
| WO | 2011057257 A1 | 5/2011 |

OTHER PUBLICATIONS

Holma, H., et al., "Introduction, in LTE for UMTS: Evolution to LTE-Advanced." 2011, p. 280, Second Edition, John Wiley & Sons, Ltd, Chichester, UK.
Unknown, Author, "Mobility simulations and discussions in Heterogeneous Networks" 3GPP TSG RAN WG2, Meeting # 81, Apr. 15-19, 2013, pp. 1-7, R2-131106, 3rd Generation Partnership Project, Chicago.
Unknown, Author, "Proposed SID: Study on UMTS Heterogeneous Networks," TSG RAN Meeting #57, Sep. 4-7, 2012, pp. 1-5, RP-121436, 3rd Generation Partnership Project, Chicago.
Astely, D. et al. "LTE: The Evolution of Mobile Broadband." IEEE Communications Magazine, Apr. 2009, pp. 44-51.
Peisa, J. et al. "High Speed Packet Access Evolution—Concept and Technologies." Proceeding of the IEEE Vehicular Technology Conference, Spring 2007, pp. 819-824.
3G Americas. "MIMO Transmission Schemes for LTE and HSPA Networks." Jun. 2009, available online at: http://www.3gamericas.org/documents/Mimo_Transmission_Schemes_for_LTE_and_HSPA_Networks_June-2009.pdf.

* cited by examiner

*Primary Examiner* — Tanmay Shah
(74) *Attorney, Agent, or Firm* — Murphy, Bilak & Homiller, PLLC

(57) ABSTRACT

A mobile terminal can receive N or less different data streams transmitted in parallel over N antennas. The number of different data streams actually transmitted in parallel to the mobile terminal corresponds to transmission rank. If the speed of the mobile terminal does not exceed a predetermined threshold, the mobile terminal utilizes a full-size codebook containing precoder elements for all N transmission ranks to determine a recommended transmission rank and precoder matrix for use in transmitting data to the mobile terminal. Otherwise, the mobile terminal utilizes a reduced-size codebook which excludes the precoder elements for at least transmission rank-N to determine the recommended transmission rank and precoder matrix where transmission rank-N corresponds to N different data streams being transmitted in parallel over the N antennas. The mobile terminal transmits an indication of the recommended transmission rank and precoder matrix to the network.

22 Claims, 4 Drawing Sheets

METHOD AND APPARATUS FOR CONTROLLING ADAPTIVE RANK MULTI ANTENNA COMMUNICATION

TECHNICAL FIELD

The present invention generally relates to wireless communication systems, and more particularly relates to controlling adaptive rank multi-antenna communication in wireless communication systems.

BACKGROUND

Several new features added to the long term HSPA (High-Speed Packet Access) evolution for meeting IMT-A (International Mobile Telecommunications Advanced) requirements increase average spectral efficiency. One possible technique for improving downlink performance is to introduce support for four branch downlink MIMO (multiple-input and multiple-output). For a fixed amount of transmission power, such an approach doubles the supported peak data rate so that 84 Mbps can be supported on a single downlink 5 MHz carrier. Also this feature improves the coverage for rank-1 and rank-2 transmissions due to the higher-order beamforming gain, where the term 'rank' refers to the number of different data streams transmitted in parallel over N antennas.

Multiple antennas employed at the transmitter and receiver can significantly increase system capacity. By transmitting independent symbol streams in the same frequency bandwidth, often referred to as spatial multiplexing (SM), a linear increase in data rates is achieved for an increased number of antennas. On the other hand, by using space-time codes at the transmitter, reliability of the detected symbols can be improved by exploiting so-called transmit diversity. Transmit diversity refers to a radio communication scheme which uses signals that originate from two or more independent sources and that have been modulated with identical information-bearing signals and that may vary in their transmission characteristics at any given instant.

Both the schemes mentioned above assume no channel knowledge at the transmitter. However, in practical wireless systems such as the 3rd generation partnership project (3GPP) long term evolution (LTE) and WiMAX systems, HSDPA (High-Speed Downlink Packet Access) etc., the channel knowledge can be made available at the transmitter via feedback from the receiver to the transmitter. The MIMO transmitter can utilize this channel information to improve system performance with the aid of precoding. In point-to-point systems, precoding means that multiple data streams are emitted from the transmit antennas with independent and appropriate weightings such that the link throughput is maximized at the receiver output. In addition to beam forming gain, the use of precoding avoids the problem of an ill-conditioned channel matrix.

The performance of 4×4 MIMO systems in general depends on the mobile terminal speed. As with other adaptive MIMO systems, the performance of a conventional system degrades at high mobile terminal speeds. The performance degradation is particularly severe for high SNR (signal-to-noise ratio) users. Another problem for a 4×4 MIMO capable mobile terminal is that determining the rank information and precoding index is cumbersome and involves many computations. The complexity at the mobile terminal becomes very large for closed loop MIMO when the codebook is large, significantly increasing the computational resources needed to perform conventional rank information and precoding index determination.

SUMMARY

Embodiments described herein provide a technique for reducing the computational complexity at the receiver while at the same time improving performance when determining MIMO rank information and precoding indices. This technique can apply to HSDPA or LTE/LTE-Advanced, and more generally to any wireless communication technology (e.g. Wi-Max etc.) that employs MIMO. The technique becomes even more advantageous as the number of antennas at the transmitter increases e.g. from four to eight antennas or more.

According to an embodiment, a mobile terminal can receive N or less different data streams transmitted in parallel over N antennas. The number of different data streams actually transmitted in parallel to the mobile terminal corresponds to transmission rank. If the speed of the mobile terminal does not exceed a predetermined threshold, the mobile terminal utilizes a full-size codebook containing precoder elements for all N transmission ranks to determine a recommended transmission rank and precoder matrix for use in transmitting data to the mobile terminal. Otherwise, the mobile terminal utilizes a reduced-size codebook which excludes the precoder elements for at least transmission rank-N to determine the recommended transmission rank and precoder matrix where transmission rank-N corresponds to N different data streams being transmitted in parallel over the N antennas. The mobile terminal transmits an indication of the recommended transmission rank and precoder matrix to the network.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
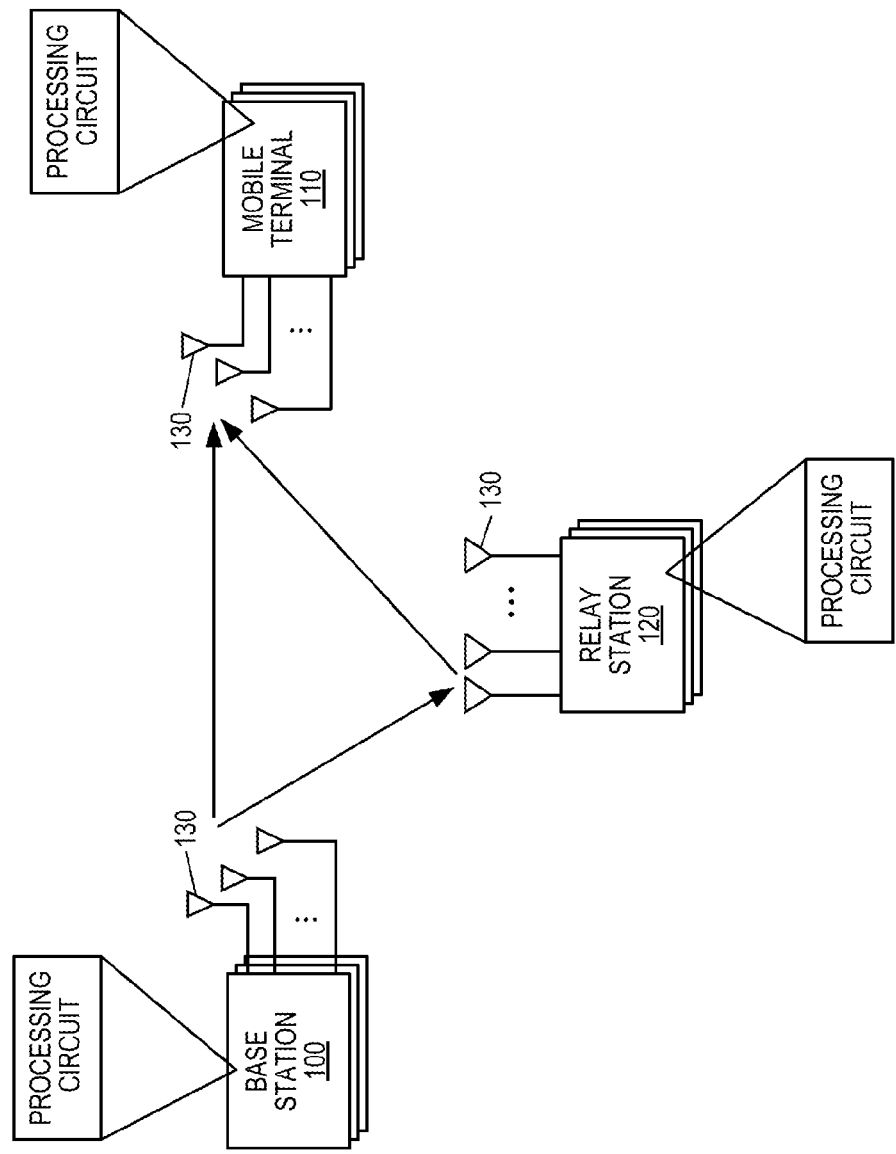
FIG. 1 is a block diagram of an embodiment of a wireless communication network which employs adaptive rank multi-antenna wireless communication.

As a non-limiting example, FIG. 1 illustrates an embodiment of a wireless communication network which includes base stations 100 serving mobile terminals 110 located within the network. The network may also include relay stations 120 which reduce the transmitter-to-receiver distance, thereby allowing for higher data rates. The wireless communication network employs MIMO which uses multiple antennas 130 at both the transmitter and receiver to improve communication performance. MIMO technology provides for significant increases in data throughput and link range without additional bandwidth or increased transmit power by spreading the same total transmit power over multiple antennas. The network can employ any wireless communication standard capable of utilizing MIMO such as HSDPA, LTE/LTE-Advanced, IEEE 802.11n (Wifi), 4G, 3GPP Long Term Evolution (LTE)/LTE-Advanced, WiMAX, HSPA+, etc.

In each case, the base stations 100 determine the data transmission scheme employed for the different mobile terminals 110 at least in part based on feedback information received from the mobile terminals 110. Particularly, each mobile terminal 110 computes channel state information from received pilots (known symbols) and conveys this information to the corresponding base station 100 directly or via a relay station 120 through a feedback channel. The base station 100 processes this information received from the mobile terminal 110 and sends data to the mobile terminal 110 through a downlink channel. The mobile terminal 110 computes the channel state information using a link adaptation algorithm based on the speed of the mobile terminal 110, and reports the channel state information in the form of a CQI (channel quality indicator) report which includes the observed CQI and PCI (precoding control indication). The PCI indicates the preferred precoding vector for the primary stream. The mobile terminal 110 also reports MIMO rank information, indicating which rank (i.e. how many different streams should be transmitted in parallel) is most ideal given the understanding of the channel by the mobile terminal 110. The base station 100 uses the CQI, PCI and MIMO rank information to determine the data transmission scheme employed for the mobile terminal 110 e.g. by selecting the best precoding matrix, MIMO rank, data transmission rate, modulation and coding scheme, etc. based on this information.

In more detail, the mobile terminals 110 are capable of receiving a number N or less different data streams transmitted in parallel over N antennas directly from a base station 100 or from a relay station 120. The number of different data streams actually transmitted in parallel to the mobile terminal 110 corresponds to transmission rank. For example in a 4×4 MIMO system, transmission rank-1 corresponds to a single data stream transmitted over four antennas, transmission rank-2 corresponds to two different data streams transmitted over four antennas, . . . , transmission rank-N corresponds to four different data streams transmitted over four antennas in this example. The embodiments described herein are not limited to 4×4 MIMO, but apply equally to any MIMO scheme e.g. 8×8 MIMO, etc.

Figure 2:
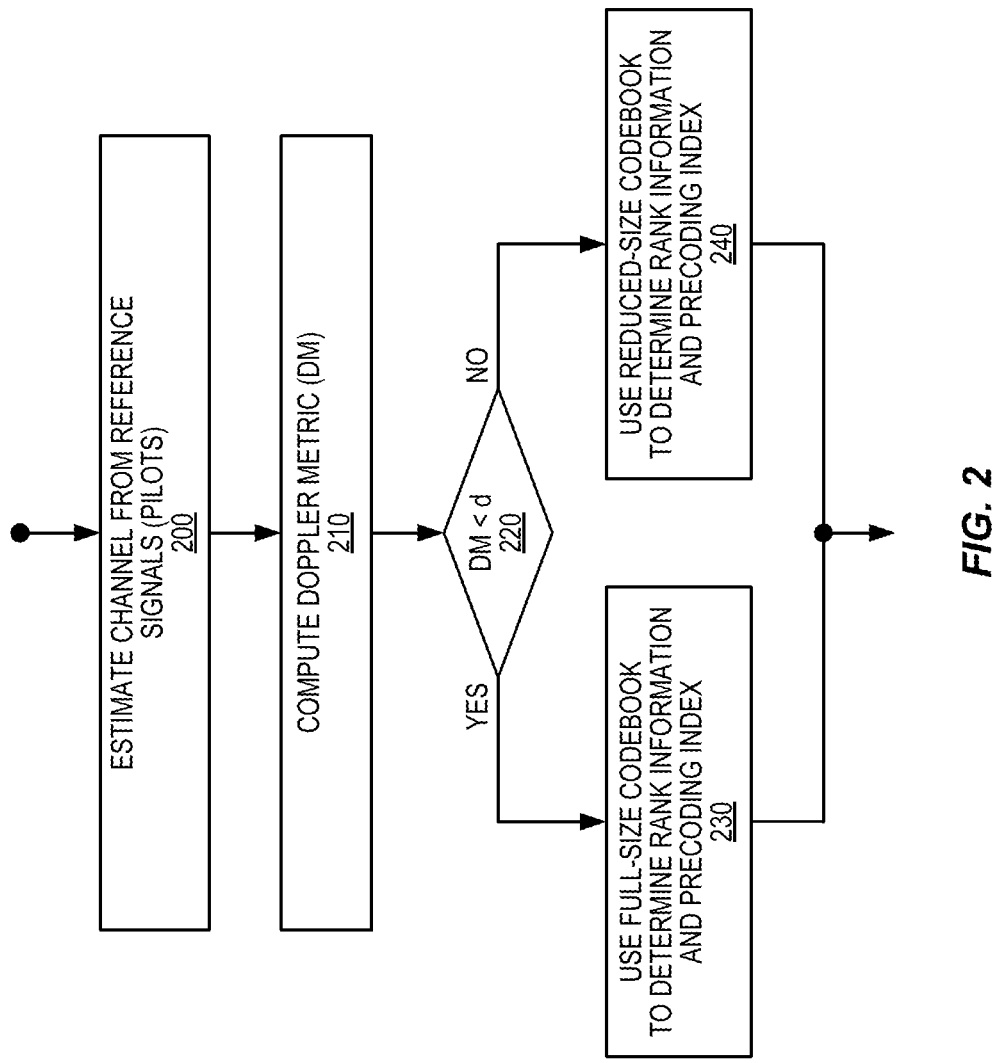
FIG. 2 is a flow diagram of an embodiment of controlling adaptive rank multi-antenna wireless communication based on mobile terminal speed.

FIG. 2 illustrates an embodiment of a method of controlling adaptive rank multi-antenna wireless communication for a mobile terminal 110 capable of receiving a number N or less different data streams transmitted in parallel over N antennas. The method includes estimating the channel from known reference symbols such as pilots (Step 200). Channel estimation is well known in the wireless communication arts, and therefore no further explanation is given in this regard.

The method further includes the mobile terminal 110 computing a Doppler metric (DM) which indicates the speed of the mobile terminal 110 (Step 210). In one embodiment, the Doppler metric is the average speed Savg of the mobile terminal 110 computed over k TTI/reporting times where TTI (transmission time intervals) refers to the duration of a transmission on the radio link and is related to the size of the data blocks passed from the higher network layers to the radio link layer. In another embodiment, the Doppler metric corresponds to the rate of change of the channel estimate computed by the mobile terminal 110 over k TTI/reporting times. In yet another embodiment, the Doppler metric corresponds to the rate of change of the CQI determined by the mobile terminal 110 over k TTI/reporting times. In still another embodiment, the Doppler metric corresponds to the rate of change of the PCI determined by the mobile terminal 110 over k TTI/reporting times.

In each case, the mobile terminal 110 assesses whether the Doppler metric exceeds a predetermined threshold (d) to determine whether a full-size precoder codebook for all ranks or a reduced-size codebook for a subset of ranks should be used to determine the recommended transmission rank and precoder matrix reported to the corresponding base station 100 for use setting the data transmission scheme for the mobile terminal 110 (Step 220). The threshold indicates the mobile terminal speed at which lower rank transmission provides better overall performance and is more robust than higher rank transmissions. Above this speed, the throughput decreases due to outdated channel information at the mobile terminal 110. Signal multiplexing becomes undesirable at this point and lower rank transmission provides better results.

The mobile terminal 110 utilizes the full-size codebook containing precoder elements for all N transmission ranks to determine the recommended transmission rank and precoder matrix if the speed of the mobile terminal e.g. as indicated by the Doppler metric does not exceed the predetermined threshold (Step 230). For example, the mobile terminal 110 can determine if its speed exceeds the predetermined threshold based on whether an average speed of the mobile terminal 110 exceeds a predetermined average speed over a plurality of reporting intervals such as TTIs (transmission time intervals), or based on whether a channel estimate computed by the mobile terminal 110 changes by more than a predetermined amount over a plurality of reporting times. Alternatively, the mobile terminal 110 can determine whether its speed exceeds the predetermined threshold based on whether channel quality information e.g. CQIs determined by the mobile terminal 110 change above a predetermined rate over a plurality of reporting times, or based on whether precoding control information e.g. PCIs determined by the mobile terminal 110 change above a predetermined rate over a plurality of reporting times.

If the speed of the mobile terminal 110 e.g. as indicated by the Doppler metric does exceed the predetermined threshold, the mobile terminal 110 utilizes a reduced-size codebook which excludes the precoder elements for at least transmission rank-N to determine the recommended transmission rank and precoder matrix (Step 240). Again, transmission rank-N corresponds to N different data streams being transmitted in parallel over the N antennas. According to one embodiment, the reduced-size codebook includes precoder elements only for transmission rank-1 where transmission rank-1 corresponds to a single data stream being transmitted in parallel over N antennas. According to an embodiment applicable to 4×4 MIMO, the reduced-size codebook includes precoder elements only for transmission rank-3 or lower where transmission rank-3 corresponds to three data streams being transmitted in parallel over four antennas. According to an embodiment applicable to 8×8 MIMO, the reduced-size codebook includes precoder elements only for transmission rank-7 or lower where transmission rank-7 corresponds to seven data streams being transmitted in parallel over eight antennas.

The mobile terminal 110 can determine the recommended transmission rank and precoder matrix using the reduced-size codebook by computing a signal-to-noise ratio (SNR) value for each precoder element included in the reduced-size codebook and computing a capacity estimate in accordance with $C=\log2(1+SNR)$ for each precoder element included in the reduced-size codebook based on the SNR value computed for each corresponding precoder element. The mobile terminal 110 then identifies the precoder control index (PCI) which maximizes the capacity estimate and determines a modulation and coding scheme suitable for the SNR value associated with the identified PCI e.g. by using lookup tables. Conventional techniques for determining transmission rank and precoder matrix based on a precoder codebook can be used instead. In either case, the mobile terminal 110 transmits an indication of the recommended transmission rank and precoder matrix to the network e.g. in the form of a combined CQI/PCI report.

In one embodiment, the predetermined threshold used to decide whether to utilize the full-size codebook or a reduced-size codebook in determining the recommended transmission rank and precoder matrix is 30 km/hour or greater at a carrier frequency of 2 GHz. In another embodiment, the predetermined threshold is 50 km/hour or greater at a carrier frequency of 700 MHz.

More than one threshold can be used. For example in an 8×8 MIMO system, a first threshold can be used to decide whether to utilize a full-size codebook containing precoder elements for all 8 transmission ranks or a first reduced-size codebook which excludes e.g. the precoder elements for transmission rank-8, rank-7, rank-6 and rank-5. A second threshold can be used to decide whether to utilize the first reduced-size codebook or a second reduced-size codebook which excludes e.g. all precoder elements except for rank-1. The reduced-size codebooks can include more or less precoder elements depending on the application, and more than two thresholds can be used if desired. In general, using a reduced-size codebook as described herein when the mobile terminal speed exceeds a particular threshold reduces computational complexity at the mobile terminal 110 under conditions which are known to be bad for higher rank transmissions. As such, the mobile terminal 110 is not forced to consider the higher rank options when determining the recommended transmission rank and precoder matrix when the mobile terminal 110 is moving so fast that the throughput decreases due to outdated channel information.

Figure 3:
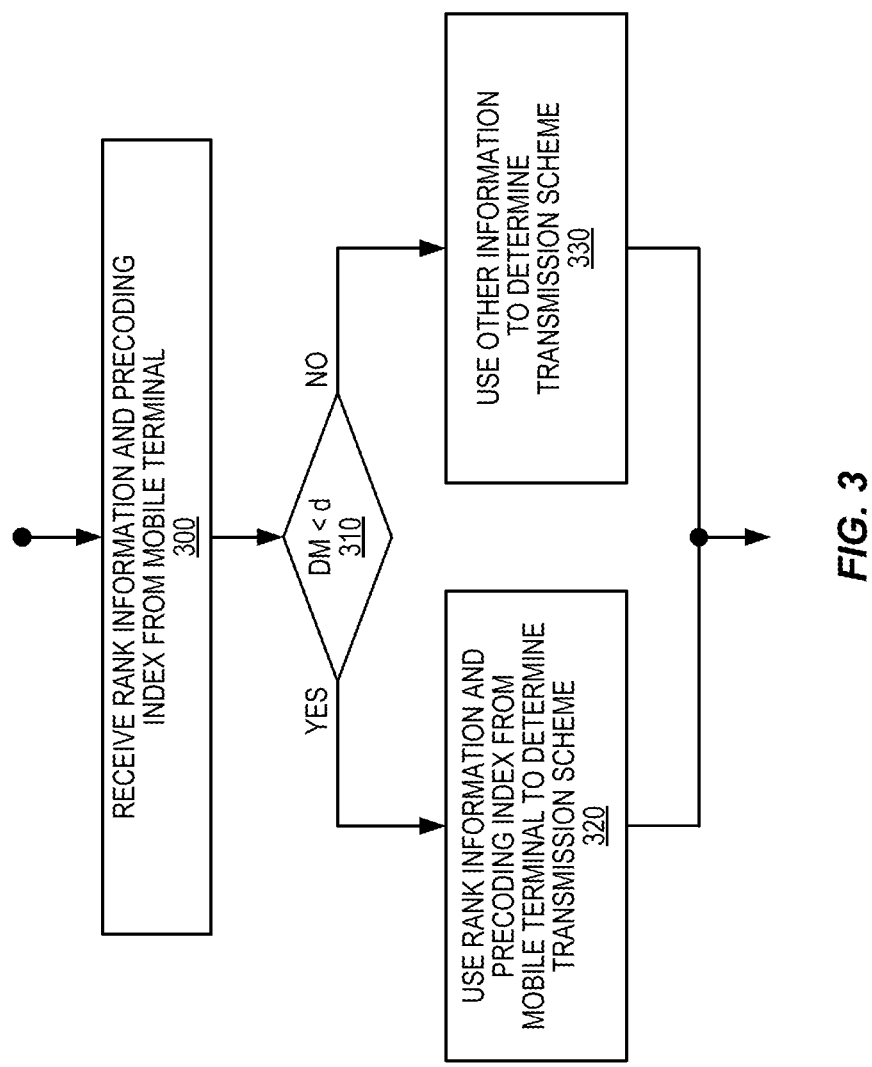
FIG. 3 is a flow diagram of an embodiment of determining downlink data transmission scheme based on mobile terminal speed.

FIG. 3 illustrates an embodiment of a method of determining a data transmission scheme at a base station 100 which controls adaptive rank multi-antenna wireless communication with a mobile terminal 110 capable of receiving a number N or less different data streams transmitted in parallel over N antennas. The method includes receiving rank information and precoding index from the mobile terminal 110 (Step 300). The rank information and precoding index are determined by the mobile terminal 110 using a full-sized precoder codebook regardless of the mobile terminal speed in this case. The base station 100 computes a Doppler metric (DM) which indicates the speed of the mobile terminal 110. The Doppler metric can be computed in accordance with any of the embodiments previously described herein, or using any conventional mobile terminal speed estimation process.

The base station 100 determines whether the mobile terminal speed exceeds a predetermined threshold (Step 310). If the mobile terminal speed e.g. as indicated by the Doppler metric indicates the speed of the mobile terminal 110 is below the predetermined threshold, the base station 100 uses the rank information and precoding index received from the mobile terminal 100 in determining the transmission scheme for the mobile terminal 110 as is conventionally done (Step 320). Otherwise, the base station 100 uses other information to determine the transmission scheme because the mobile terminal 110 is moving at such high speed that the mobile terminal 110 most likely used outdated channel information to determine the rank information and precoding index (Step 330). The base station 100 ignores the recommendation from the mobile terminal 110 in this case, instead using a fixed or predetermined precoder matrix available at the base station 100 to determine the transmission scheme. In other embodiments, a relay station 120 between the base station 100 and mobile terminate 120 performs the method of FIG. 3.

Figure 4:
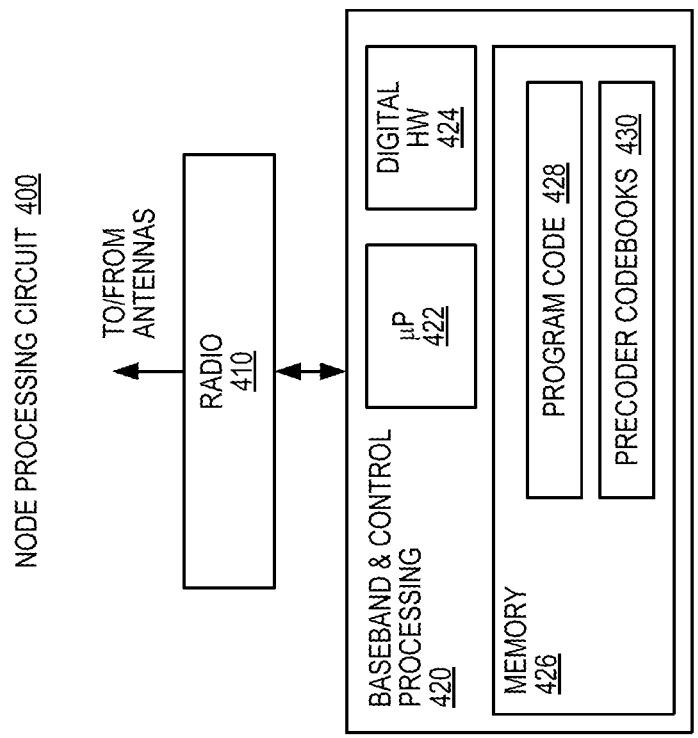
FIG. 4 is a block diagram of an embodiment of a processing circuit included in the nodes of the wireless communication network shown in FIG. 1.

FIG. 4 illustrates a block diagram of an embodiment of processing circuit 400 included in each node of the network i.e. in the mobile terminal 110, base station 100 and relay station 120. Each processing circuit 400 includes components common to each node of the network. For example, radio circuitry 410 is provided for handling the transmission and reception of radio signals over the air interface. Baseband and control circuitry 420 is provided for handling all baseband functions at the respective nodes. The baseband functionality may be different at each node, but minimally includes a microprocessor 422, digital hardware 424 and memory 426. The memory 426 stores program code executed at the respective nodes, including code 428 for implementing the adaptive rank multi-antenna control and/or data transmission configuration processes described herein. The mobile terminal memory 426 stores the full-size and reduced-size precoder codebooks 430 described herein. The base station and/or relay station memory 426 stores the fixed or predetermined precoder matrix used by the base station/relay station 100/120 in determining the data transmission scheme for a mobile terminal 110 in the event the terminal 110 is moving too fast and the rank information and precoding index provided by the mobile terminal 110 is ignored when determining the data transmission scheme.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, in a mobile terminal configured to receive a number N or less different data streams transmitted in parallel over N antennas where N is an integer greater than one, of controlling adaptive rank multi-antenna wireless communication for the mobile terminal, the number of different data streams actually transmitted in parallel to the mobile terminal corresponding to transmission rank, the method comprising:

utilizing a full-size codebook containing precoder elements for all N transmission ranks to determine a recommended transmission rank and precoder matrix for use in transmitting data to the mobile terminal if a speed of the mobile terminal does not exceed a predetermined threshold;

utilizing a reduced-size codebook which excludes the precoder elements for at least transmission rank-N to determine the recommended transmission rank and precoder matrix for use in transmitting data to the mobile terminal if the speed of the mobile terminal exceeds the predetermined threshold, wherein transmission rank-N corresponds to N different data streams being transmitted in parallel over the N antennas; and transmitting an indication of the recommended transmission rank and precoder matrix to a network.

2. A method according to claim 1, wherein the reduced-size codebook includes precoder elements only for transmission rank-1, transmission rank-1 corresponding to a single data stream being transmitted in parallel over the N antennas.

3. A method according to claim 1, wherein N=4 and the reduced-size codebook includes precoder elements only for transmission rank-3 or lower, transmission rank-3 corresponding to three data streams being transmitted in parallel over four antennas.

4. A method according to claim 1, wherein N=8 and the reduced-size codebook includes precoder elements only for transmission rank-7 or lower, transmission rank-7 corresponding to seven data streams being transmitted in parallel over eight antennas.

5. A method according to claim 1, wherein the predetermined threshold is 30 km/hour or greater at a carrier frequency of 2 GHz.

6. A method according to claim 1, wherein the predetermined threshold is 50 km/hour or greater at a carrier frequency of 700 MHz.

7. A method according to claim 1, wherein the recommended transmission rank and precoder matrix are determined using the reduced-size codebook by:
   computing a signal-to-noise (SNR) value for each precoder element included in the reduced-size codebook;
   computing a capacity estimate for each precoder element included in the reduced-size codebook based on the SNR value computed for each corresponding precoder element;
   identifying a precoder control index which maximizes the capacity estimate; and
   determining a modulation and coding scheme suitable for the SNR value associated with the identified precoder control index.

8. A method according to claim 1, further comprising determining whether the speed of the mobile terminal exceeds the predetermined threshold based on whether an average speed of the mobile terminal exceeds a predetermined average speed over a plurality of reporting intervals.

9. A method according to claim 1, further comprising determining whether the speed of the mobile terminal exceeds the predetermined threshold based on whether a channel estimate computed by the mobile terminal changes by more than a predetermined amount over a plurality of reporting times.

10. A method according to claim 1, further comprising determining whether the speed of the mobile terminal exceeds the predetermined threshold based on whether channel quality information determined by the mobile terminal changes above a predetermined rate over a plurality of reporting times.

11. A method according to claim 1, further comprising determining whether the speed of the mobile terminal exceeds the predetermined threshold based on whether precoding control information determined by the mobile terminal changes above a predetermined rate over a plurality of reporting times.

12. A mobile terminal capable of receiving a number N or less different data streams transmitted in parallel over N antennas where N is an integer greater than one, the number of different data streams actually transmitted in parallel to the mobile terminal corresponding to transmission rank, the mobile terminal comprising:
   a processing circuit operable to:
      utilize a full-size codebook containing precoder elements for all N transmission ranks to determine a recommended transmission rank and precoder matrix for use in transmitting data to the mobile terminal if a speed of the mobile terminal does not exceed a predetermined threshold; and
      utilize a reduced-size codebook which excludes the precoder elements for at least transmission rank-N to determine the recommended transmission rank and precoder matrix for use in transmitting data to the mobile terminal if the speed of the mobile terminal exceeds the predetermined threshold, wherein transmission rank-N corresponds to N different data streams being transmitted in parallel over the N antennas; and
   a transmitter operable to transmit an indication of the recommended transmission rank and precoder matrix to a network.

13. A mobile terminal according to claim 12, wherein the reduced-size codebook includes precoder elements only for transmission rank-1, transmission rank-1 corresponding to a single data stream being transmitted in parallel over the N antennas.

14. A mobile terminal according to claim 12, wherein N=4 and the reduced-size codebook includes precoder elements only for transmission rank-3 or lower, transmission rank-3 corresponding to three data streams being transmitted in parallel over four antennas.

15. A mobile terminal according to claim 12, wherein N=8 and the reduced-size codebook includes precoder elements only for transmission rank-7 or lower, transmission rank-7 corresponding to seven data streams being transmitted in parallel over eight antennas.

16. A mobile terminal according to claim 12, wherein the predetermined threshold is 30 km/hour or greater at a carrier frequency of 2 GHz.

17. A mobile terminal according to claim 12, wherein the predetermined threshold is 50 km/hour or greater at a carrier frequency of 700 MHz.

18. A mobile terminal according to claim 12, wherein the processing circuit is operable to determine the recommended transmission rank and precoder matrix using the reduced-size codebook by:
   computing a signal-to-noise (SNR) value for each precoder element included in the reduced-size codebook;
   computing a capacity estimate for each precoder element included in the reduced-size codebook based on the SNR value computed for each corresponding precoder element;
   identifying a precoder control index which maximizes the capacity estimate; and
   determining a modulation and coding scheme suitable for the SNR value associated with the identified precoder control index.

19. A mobile terminal according to claim 12, wherein the processing circuit is further operable to determine whether the speed of the mobile terminal exceeds the predetermined threshold based on whether an average speed of the mobile terminal exceeds a predetermined average speed over a plurality of reporting intervals.

20. A mobile terminal according to claim 12, wherein the processing circuit is further operable to determine whether the speed of the mobile terminal exceeds the predetermined threshold based on whether a channel estimate computed by the mobile terminal changes by more than a predetermined amount over a plurality of reporting times.

21. A mobile terminal according to claim 12, wherein the processing circuit is further operable to determine whether the speed of the mobile terminal exceeds the predetermined threshold based on whether channel quality information determined by the mobile terminal changes above a predetermined rate over a plurality of reporting times.

22. A mobile terminal according to claim 12, wherein the processing circuit is further operable to determine whether the speed of the mobile terminal exceeds the predetermined threshold based on whether precoding control information determined by the mobile terminal changes above a predetermined rate over a plurality of reporting times.

* * * * *